US012752451B2

(12) United States Patent
Song et al.

(10) Patent No.: US 12,752,451 B2
(45) Date of Patent: Oct. 6, 2026

(54) CUTTING MECHANISM AND FEEDING DEVICE

(71) Applicant: WUXI LEAD INTELLIGENT EQUIPMENT CO., LTD., Wuxi (CN)

(72) Inventors: Yaoguang Song, Wuxi (CN); Xiaofei Yang, Wuxi (CN)

(73) Assignee: WUXI LEAD INTELLIGENT EQUIPMENT CO., LTD., Wuxi (CN)

(*) Notice: Subject to any disclaimer, the term of this patent is extended or adjusted under 35 U.S.C. 154(b) by 896 days.

(21) Appl. No.: 18/148,074

(22) Filed: Dec. 29, 2022

(65) Prior Publication Data

US 2024/0066739 A1 Feb. 29, 2024

Related U.S. Application Data

(63) Continuation of application No. PCT/CN2022/129209, filed on Nov. 2, 2022.

(30) Foreign Application Priority Data

Aug. 31, 2022 (CN) ........................ 202222309302.X

(51) Int. Cl.
*B26D 1/60* (2006.01)
*B26D 7/02* (2006.01)
(Continued)

(52) U.S. Cl.
CPC ................. *B26D 1/60* (2013.01); *B26D 7/02* (2013.01); *B26D 7/2614* (2013.01); *H01M 10/0404* (2013.01)

(58) Field of Classification Search
CPC ... B26D 1/01; B26D 1/02; B26D 1/04; B26D 1/06; B26D 1/08; B26D 1/60; B26D 5/02;
(Continued)

(56) References Cited

U.S. PATENT DOCUMENTS

| | | | | |
|---|---|---|---|---|
| 1,449,264 A * | 3/1923 | Cannard | D06H 7/02 83/349 |
| 3,540,333 A * | 11/1970 | Johnson | B26D 1/60 82/101 |

(Continued)

FOREIGN PATENT DOCUMENTS

| | | |
|---|---|---|
| CN | 211966085 U | 11/2020 |
| CN | 211966092 U | 11/2020 |

(Continued)

OTHER PUBLICATIONS

Search Report issued on May 29, 2023, in corresponding International Application No. PCT/CN2022/129209, 6 pages.

*Primary Examiner* — Omar Flores Sanchez
(74) *Attorney, Agent, or Firm* — Maier & Maier, PLLC

(57) ABSTRACT

The application relates to a cutting mechanism and a feeding device. The cutting mechanism comprises a cutter holder; a stationary cutter fixedly arranged on the cutter holder; a moving cutter assembly comprising a mounting piece and a moving cutter, the mounting piece being slidably arranged on the cutter holder in a first direction, the moving cutter being mounted on the mounting piece, and the mounting piece having a centerline parallel to the first direction; and a driving assembly comprising a first end and a second end, the first end being matched with a guide mechanism, and the second end being connected with a part of the mounting piece corresponding to the centerline; when the cutter holder drives parts located thereon to move in a second direction, the guide mechanism can drive the driving assembly to apply a driving force to the mounting piece in the first direction.

13 Claims, 8 Drawing Sheets

(51) Int. Cl.
*B26D 7/26* (2006.01)
*H01M 10/04* (2006.01)

(58) Field of Classification Search
CPC ... B26D 7/01; B26D 7/02; B26D 7/26; B26D 7/2614
USPC .......................................................... 83/310
See application file for complete search history.

(56) References Cited

U.S. PATENT DOCUMENTS

| | | | | |
|---|---|---|---|---|
| 5,436,646 | A * | 7/1995 | Schilling | B26D 1/045 346/139 R |
| 2005/0061132 | A1* | 3/2005 | Sodeyama | B41J 11/703 83/694 |
| 2007/0199422 | A1 | 8/2007 | Kawaguchi | |
| 2013/0192437 | A1* | 8/2013 | Sahlberg | A47K 10/3643 83/304 |
| 2019/0143548 | A1 | 5/2019 | Park | |
| 2023/0001597 | A1* | 1/2023 | Crystal | B26D 1/60 |
| 2023/0137474 | A1* | 5/2023 | Jeong | B26D 7/26 83/642 |

FOREIGN PATENT DOCUMENTS

| | | | |
|---|---|---|---|
| CN | 214108979 | U | 9/2021 |
| WO | 2024045316 | A1 | 3/2024 |

* cited by examiner

CUTTING MECHANISM AND FEEDING DEVICE

TECHNICAL FIELD

The application relates to the technical field of battery manufacturing equipment, in particular to a cutting mechanism and a feeding device.

BACKGROUND

In the process of battery manufacturing, a cutting mechanism is used to cut a pole piece. The cutting mechanism comprises a cutter holder, a stationary cutter and a moving cutter assembly, the stationary cutter is fixedly arranged on the cutter holder, the moving cutter assembly comprises a guide rod and a guide rod frame, the guide rod is slidably connected with the cutter holder, and the moving cutter and the guide rod frame are respectively connected with two ends of the guide rod. The cutting mechanism also comprises a driving assembly which is connected with the guide rod frame. During working, the driving assembly drives the guide rod frame to drive the guide rod to move, so that the moving cutter moves towards the stationary cutter, and the moving cutter and the stationary cutter cooperate to cut the pole piece.

Generally, the driving assembly is connected to one end of the guide rod frame, so that a force application point for the driving assembly to act on the guide rod frame is at one end of the guide rod frame, which leads to greater stress and more serious wear of the guide rod near the force application point, and thus different places of the guide rod have different wear degrees. As a result, inclining guide is caused, which leads to a gap between the moving cutter and the stationary cutter, so the cutting effect is poor, for example, burrs tend to be generated from cutting.

SUMMARY

In view of the problem of poor cutting effect of a traditional cutting mechanism, it is necessary to provide a cutting mechanism which can improve the cutting effect and a feeding device.

A cutting mechanism comprises:

a cutter holder;

a stationary cutter fixedly arranged on the cutter holder;

a moving cutter assembly comprising a mounting piece and a moving cutter, the mounting piece being slidably arranged on the cutter holder in a first direction, the moving cutter being mounted on the mounting piece, and the mounting piece having a centerline parallel to the first direction; and a driving assembly comprising a first end and a second end, the first end being matched with a guide mechanism, and the second end being connected with a part of the mounting piece corresponding to the centerline;

when the cutter holder drives parts located thereon to move in a second direction, the guide mechanism can drive the driving assembly to apply a driving force to the mounting piece in the first direction, so that the mounting piece drives the moving cutter to move close to the stationary cutter to cut a workpiece at a preset position, and the first direction intersects the second direction.

In one embodiment, the mounting piece comprises a guide member and a connecting member, and the guide member is slidably arranged on the cutter holder in the first direction; and in the first direction, the moving cutter and the connecting member are respectively connected to two ends of the guide member, and the driving assembly is connected with a part of the connecting member corresponding to the centerline.

In one embodiment, the guide member comprises at least two groups of guide rods, each group of guide rods comprises at least one guide rod, and the extension direction of each guide rod is parallel to the first direction; and the two groups of guide rods are symmetrically arranged on two sides of the centerline, and two ends of each guide rod are respectively connected with the moving cutter and the connecting member.

In one embodiment, guide sleeves are arranged in the cutter holder, and each guide rod is sleeved with the corresponding guide sleeve.

In one embodiment, the cutting mechanism further comprises first elastic pieces, and the first elastic pieces are arranged between the guide sleeves and the connecting member.

In one embodiment, the mounting piece further comprises a mounting plate, the mounting plate is connected with the guide member, and the moving cutter is mounted on the mounting plate.

In one embodiment, the cutting mechanism further comprises a pressing piece, and the pressing piece is movably arranged on the mounting plate in the first direction to press the workpiece on the stationary cutter before the moving cutter and the stationary cutter cooperate to cut the workpiece.

In one embodiment, the driving assembly comprises a driving plate, a mating piece and a connecting block, the mating piece is connected with the driving plate and matched with the guide mechanism, and the connecting block is connected with the driving plate and the mounting piece.

In one embodiment, the connecting block comprises a first connecting part and a second connecting part, the first connecting part is connected with one of the mounting piece and the driving plate, and the second connecting part is connected with the other of the mounting piece and the driving plate; and The first connecting part is provided with a mating hole, the second connecting part extends in a direction parallel to the second direction, and the second connecting part penetrates through the mating hole.

In one embodiment, the mating hole is a waist-shaped hole, the waist-shaped hole extends longitudinally in a direction parallel to a third direction, a moving gap exists between the second connecting part and the mating hole in the third direction, and the first direction, the second direction and the third direction intersect each other.

In one embodiment, the second connecting part comprises a body and a sleeve sleeving the body, and both the body and the sleeve penetrate through the mating hole.

In one embodiment, the driving plate is of an L-shaped structure, the mating piece is connected with a short side of the L-shaped structure, and the connecting block is connected with an outer side of a long side of the L-shaped structure.

In one embodiment, one of the driving assembly and the cutter holder is provided with first sliding rails parallel to the first direction, the other is provided with first sliders, and the first sliders are slidably connected with the first sliding rails.

In one embodiment, the cutting mechanism further comprises a second elastic piece, and the second elastic piece is sandwiched between the cutter holder and the stationary cutter.

A feeding device comprises the cutting mechanism as described above.

In one embodiment, the feeding device further comprises a clamping mechanism for clamping the workpiece, the clamping mechanism is slidably connected with the mounting base in the second direction, and the clamping mechanism and the cutting mechanism are sequentially arranged in the second direction; and in the second direction, the clamping mechanism and the cutting mechanism are able to synchronously slide relative to the mounting base.

In one embodiment, the clamping mechanism comprises a clamping base, a fixed clamping roller and a movable clamping roller, the clamping base is slidably connected with the mounting base in the second direction, the fixed clamping roller is fixedly arranged on the clamping base, and the movable clamping roller is movably connected with the clamping base to cooperate with the fixed clamping roller to clamp the workpiece.

In one embodiment, the feeding device further comprises a first actuator, the cutter holder is connected with a first driving end of the first actuator, and the first actuator is able to drive the cutter holder to move in the second direction together with parts thereon.

In one embodiment, the feeding device further comprises a guide mechanism, a side of the guide mechanism facing the driving assembly, is provided with a guide groove, and the guide groove is provided with a first straight groove section, an arc groove section and a second straight groove section which communicate with each other in sequence; and the first straight groove section and the second straight groove section both extend in the second direction, the arc groove section bends in the first direction to one side of the stationary cutter, and a first end of the driving assembly is slidably arranged in the guide groove.

In one embodiment, the feeding device further comprises a second actuator, the guide mechanism is connected with a second driving end of the second actuator, and the second actuator is able to drive the guide mechanism to move away from or close to the driving assembly to adjust the distance between the guide mechanism and the driving assembly.

According to the cutting mechanism and the feeding device, because the driving assembly is connected with the part of the mounting piece corresponding to the centerline, a force application point for the driving assembly to act on the mounting piece is located on the centerline of the mounting piece, so that the parts of the mounting piece on two sides of the centerline are subjected to equal stress; and compared with the prior art where a force application point of the driving assembly is close to one end of the mounting piece, the problem that an end, avoid wear more seriously at the end of the connection between the mounting piece and the cutter holder, which is close to a force application point, thus causing a cutting gap between the moving cutter and the stationary cutter is solved, and the cutting effect is good.

DETAILED DESCRIPTION OF THE EMBODIMENTS

Figure 1:
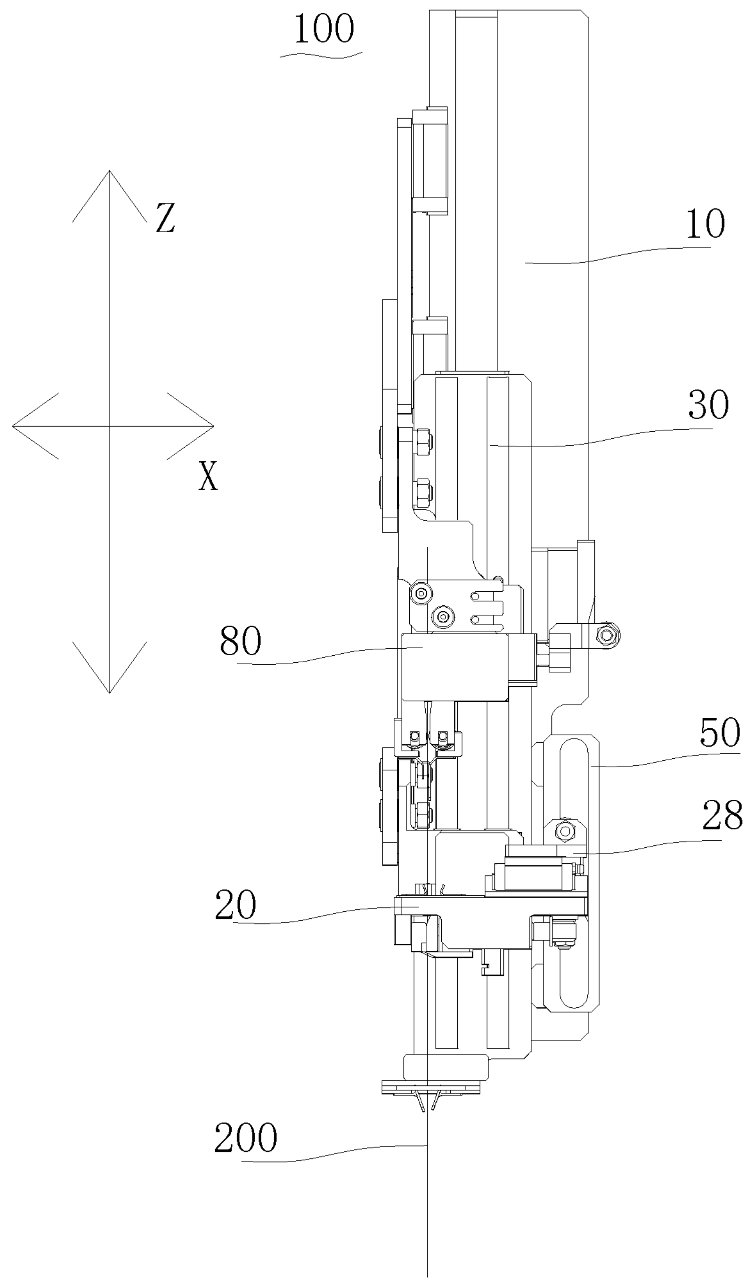
FIG. 1 is a front view of a feeding device provided by an embodiment of the application.

In order to make the above objects, features and advantages of this application more obvious and understandable, the following detailed description of this application will be made with reference to the accompanying drawings. In the following description, numerous specific details are set forth in order to provide a thorough understanding of the application. However, this application can be implemented in many other ways different from those described here, and those skilled in the art can make similar improvements without violating the connotation of this application. Therefore, this application is not limited by the specific embodiments disclosed below.

In the description of the application, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counter clockwise", "axial", "radial" and "circumferential" are based on the directional or positional relationships shown in the drawings, which are only for the convenience of describing the application and simplifying the description, but do not indicate or imply that the referred devices or elements must have a specific orientation or be constructed and operated in a specific orientation, so they cannot be understood as limiting the application.

In addition, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this application, "multiple" means at least two, such as two, three, etc., unless otherwise specifically defined.

In the application, unless otherwise specified and defined, the terms "install", "connect" and "fix" should be understood in a broad sense. For example, it can be fixed connection, detachable connection or integrated connection; it can be mechanical connection or electric connection; and it can be direct connection, indirect connection through intermediate media or internal communication or interaction of two elements, unless otherwise explicitly defined. Those of ordinary skill in the art can understand the specific meaning of the above terms in the application in specific situations.

In this application, unless otherwise specified and limited, the expression that a first feature is "above" or "below" a second feature may mean that the first feature and the second feature are in direct contact, or the first feature and the second feature are in indirect contact through an intermediary. Further, the expression that the first feature is "above"

the second feature may be that the first feature is directly above or obliquely above the second feature, or it only means that a level of the first feature is higher than that of the second feature; and the expression that the first feature is "below" the second feature may be that the first feature is directly below or obliquely below the second feature, or it only means that the level of the first feature is lower than that of the second feature.

It should be noted that when an element is described as being "fixed to" or "arranged on" another element, it may be directly on another element or there may be an intermediate element. When an element is considered to be "connected" to another element, it may be directly connected to another element or there may be an intermediate element. The terms "vertical", "horizontal", "upper", "lower", "left", "right" and similar expressions used herein are for the purpose of illustration only, and are not meant to be the only implementation.

Referring to FIG. 1, an embodiment of the application provides a feeding device 100, which is used for feeding and cutting a workpiece 200. Specifically, the workpiece 200 is a pole piece for manufacturing a battery. It should be understood that, in other embodiments, the type of the workpiece 200 is not limited.

The application will be described in detail below by assuming that the feeding device 100 is used for feeding and cutting a pole piece, but this description will not limit the protection scope of the application.

Figure 3:
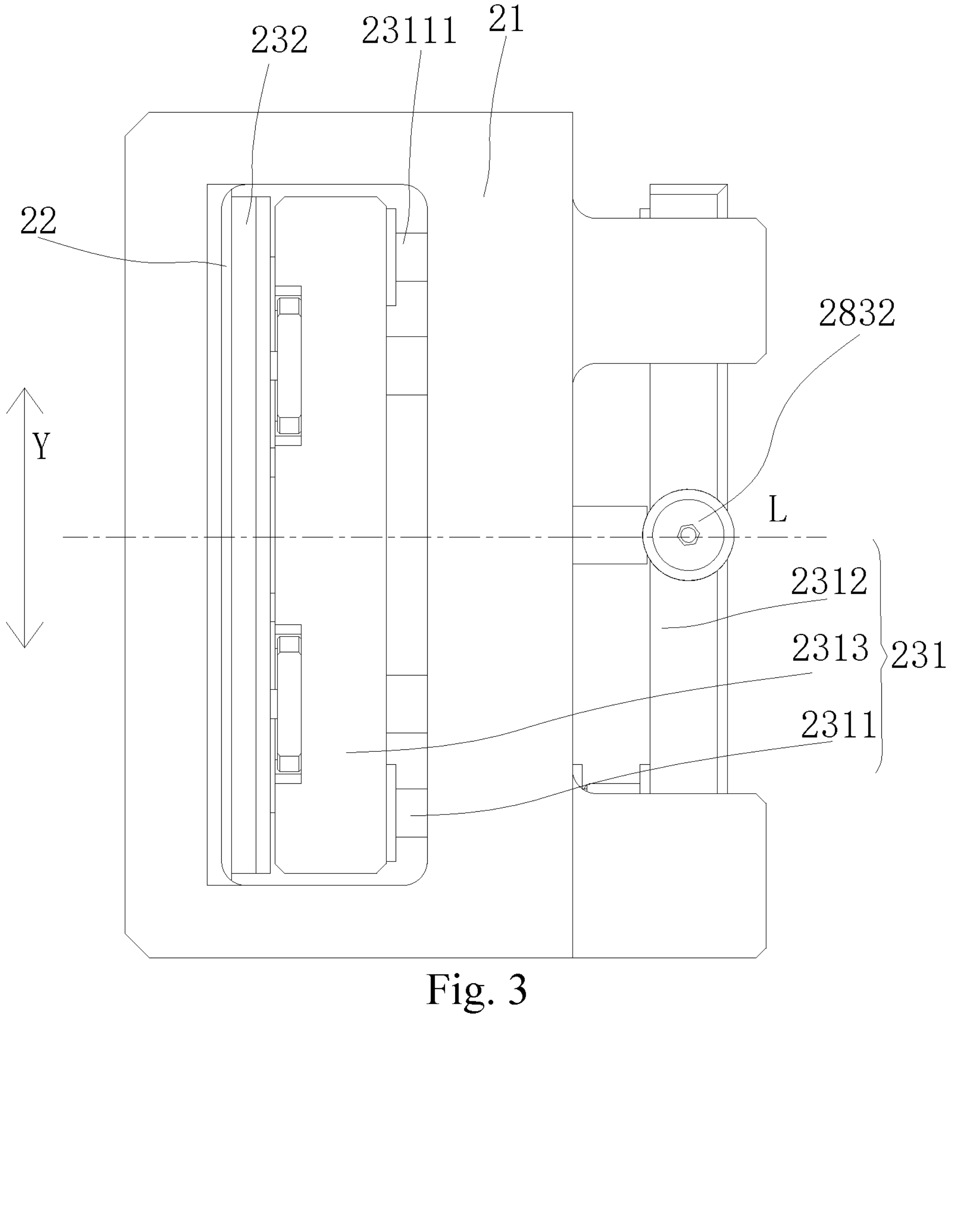
FIG. 3 is a top view of the structure shown in FIG. 2.
Figure 4:
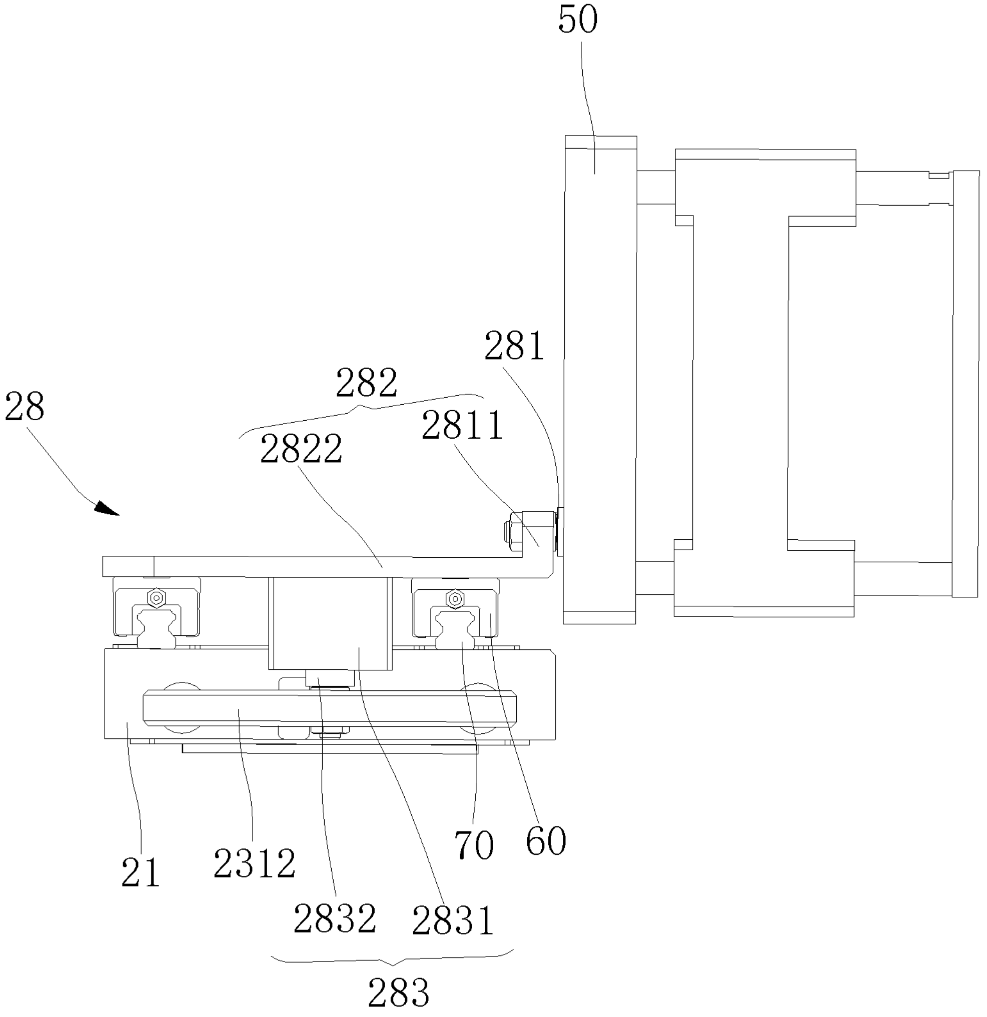
FIG. 4 is a right side view of a cutting mechanism and a guide mechanism of the feeding device shown in FIG. 1.

The feeding device 100 comprises a mounting base 10 and a cutting mechanism 20, and the cutting mechanism 20 is mounted on the mounting base 10. Specifically, referring to FIGS. 1 and 2, the cutting mechanism 20 comprises a cutter holder 21, a stationary cutter 22, a moving cutter assembly 23 and a driving assembly 28. The cutter holder 21 is installed on the mounting base 10, and the stationary cutter 22 is fixedly arranged on the cutter holder 21. Referring to FIG. 3, the moving cutter assembly 23 comprises a mounting piece 231 and a moving cutter 232. The mounting piece 231 is slidably arranged on the cutter holder 21 in a first direction, and the moving cutter 232 is mounted on the mounting piece 231. Referring to FIGS. 1 and 4, the feeding device 100 further comprises a guide mechanism 50, the driving assembly 28 comprises a first end and a second end, the first end is matched with the guide mechanism 50, and the second end is connected with the mounting piece 231.

Further, the cutter holder 21 is slidably connected with the mounting base 10 in a second direction, and the first direction intersects the second direction. Specifically, the mounting base 10 is provided with a second sliding rail 30 extending in the second direction, and the cutter holder 21 is provided with a second slider which is slidably connected with the second sliding rail 30. The cutter holder 21 is matched with the second sliding rail 30 through the second slider to be slidably connected with the mounting base 10 in the second direction, so that the cutter holder 21 moves more smoothly. When the cutter holder 21 drives parts located thereon to move in the second direction relative to the mounting base 10, the guide mechanism 50 can drive the driving assembly 28 to apply a driving force to the mounting piece 231 in the first direction, so that the mounting piece 231 drives the moving cutter 232 to move close to the stationary cutter 22 to cut a workpiece 200 at a preset position.

When the feeding device 100 is in operation, the pole piece enters between the stationary cutter 22 and the moving cutter 232. The cutter holder 21 is controlled to drive parts located thereon to move in the second direction relative to the mounting base 10, and the movement speed is equal to the conveying speed of the pole piece. During the movement of the cutter holder 21 in the second direction relative to the mounting base 10, the guide mechanism 50 can drive the driving assembly 28 to apply a driving force to the mounting piece 231 in the first direction, and the mounting piece 231 drives the moving cutter 232 to move close to the stationary cutter 22, and finally the moving cutter 232 cooperates with the stationary cutter 22 at a preset position to cut off the pole piece. In this way, when the cutter holder 21 drives the parts located thereon to move relative to the mounting base 10 in the second direction, the driving assembly 28 can apply a driving force to the mounting piece 231, and the mounting piece 231 drives the moving cutter 232 to move close to the stationary cutter 22 to cooperate with the stationary cutter 22 to cut off the pole piece at the preset position, thus realizing the effect of fly-cutting which can cut the pole piece rapidly, shortening cutting time and improving production efficiency.

It should be noted that cutting the pole piece at the preset position means that the driving assembly 28 will not apply a driving force on the mounting piece 231 at any position when the cutter holder 21 moves in the second direction relative to the mounting base 10, instead, the driving assembly 28 applies a driving force on the mounting piece 231 in the first direction only when the cutter holder 21 moves to a certain position relative to the mounting base 10. Only when the driving assembly 28 applies a driving force to the mounting piece 231 in the first direction, the moving cutter 232 moves toward the stationary cutter 22 and finally cooperates with the stationary cutter 22 to cut the pole piece at the preset position.

The second direction is parallel to the conveying direction of the pole piece (that is, the length direction of the pole piece). Specifically, the second direction is perpendicular to the first direction. The first direction is perpendicular to a plane where the pole piece is located, that is, the first direction is the thickness direction of the pole piece.

Further, both the stationary cutter 22 and the moving cutter 232 extend in a direction parallel to the third direction, and the first direction, the second direction and the third direction are perpendicular to each other. In this case, the third direction is the width direction of the pole piece. The extension length of the stationary cutter 22 and the moving cutter 232 in the third direction is larger than the width of the pole piece, so as to cut off the pole piece.

Referring to FIG. 1, the first direction is the direction X in FIG. 1, and the second direction is the direction Z in FIG. 1. Referring to FIG. 3, the third direction is the direction Y in FIG. 3, which is also the direction perpendicular to the principal plane shown in FIG. 1.

Figure 5:
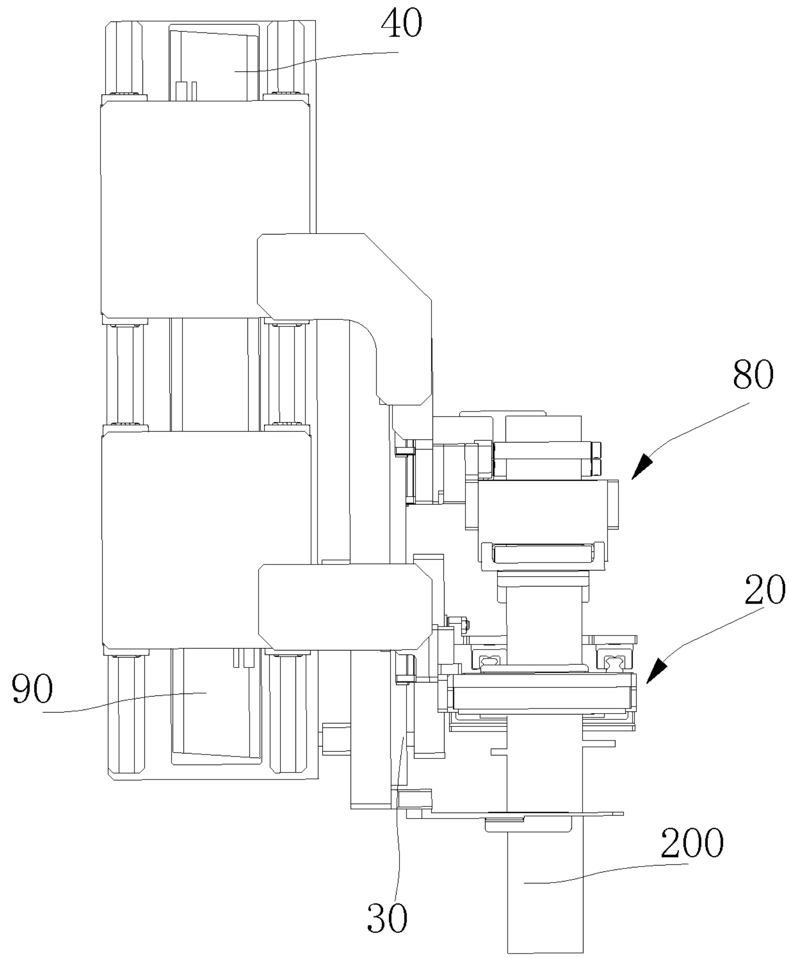
FIG. 5 is a left side view of the feeding device shown in FIG. 1.

Referring to FIG. 5, the feeding device 100 further comprises a first actuator 40, and the cutter holder 21 is connected with a first driving end of the first actuator 40, and the first actuator 40 is able to drive the cutter holder 21 to move in the second direction together with parts thereon. Specifically, the first actuator 40 is a motor, and the motor is connected with the cutter holder 21 through a screw module. Of course, in other embodiments, the type of the first actuator 40 is not limited, for example, the first actuator 40 may be a cylinder.

Figure 2:
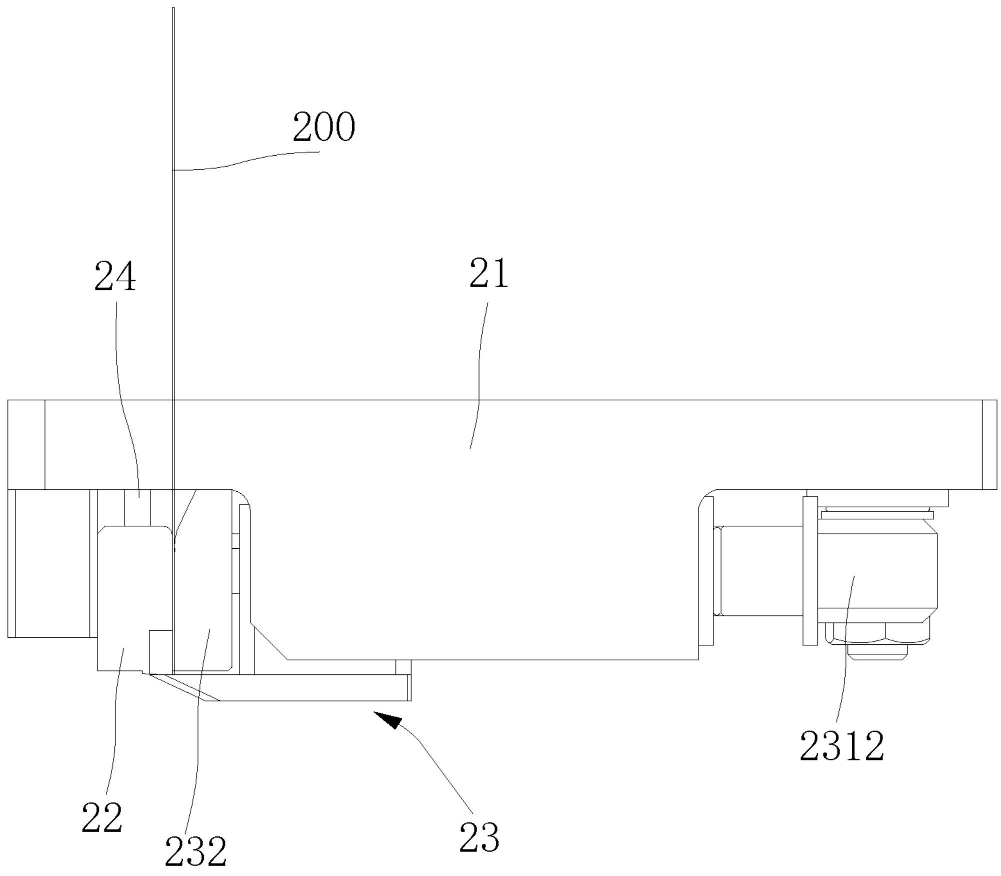
FIG. 2 is a front view of a partial structure of a cutting mechanism of the feeding device shown in FIG. 1.

In an embodiment, referring to FIG. 2, the cutting mechanism 20 is further provided with a second elastic piece 24, and the second elastic piece 24 is sandwiched between the cutter holder 21 and the stationary cutter 22. The second elastic piece 24 is provided to adjust a gap between the stationary cutter 22 and the moving cutter 232.

In one embodiment, referring to FIG. 3, the mounting piece 231 has a centerline L parallel to the first direction, and a second end of the driving assembly 28 is connected to a part of the mounting piece 231 corresponding to the centerline L. Because the driving assembly 28 is connected with the part of the mounting piece 231 corresponding to the centerline L, a force application point for the driving assembly 28 to act on the mounting piece 231 is located on the centerline L of the mounting piece 231, so that the parts of the mounting piece 231 on two sides of the centerline L, are subjected to equal stress; and compared with the prior art where a force application point of the driving assembly 28 is close to one end of the mounting piece 231, the problem that an end, avoid wear more seriously at the end of connection between the mounting piece 231 and the cutter holder 21, which close to a force application point, thus causing a cutting gap between the moving cutter 232 and the stationary cutter 22 is solved, and the cutting effect is good.

It should be noted that the centerline L is located on the plane where the mounting piece 231 is located. The second end of the driving assembly 28 being connected to the part of the mounting piece 231 corresponding to the centerline L means that the driving assembly 28 can be connected to a position of the mounting piece 231 corresponding to the centerline L in the extending direction of the centerline L, so as to ensure that the force application point allowing the driving assembly 28 to act on the mounting piece 231 is located on the centerline L of the mounting piece 231, which further ensures that the parts, on two sides of the centerline L, of the mounting piece 231 are subjected to equal stress.

Referring to FIG. 3, the mounting piece 231 comprises a guide member 2311 and a connecting member 2312, and the guide member 2311 is slidably disposed on the cutter holder 21 in the first direction. In the first direction, the moving cutter 232 and the connecting member 2312 are respectively connected to two ends of the guide member 2311, and the second end of the driving assembly 28 is connected to the connecting member 2312. The second end of the driving assembly 28 is connected to a part of the connecting member 2312 corresponding to the centerline L. Referring to FIG. 3, the second end of the driving assembly 28 is connected to a middle part of the connecting member 2312 in the third direction. When the driving assembly 28 drives the connecting member 2312 to move, the guide member 2311 drives the moving cutter 232 to move in the first direction.

Since the second end of the driving assembly 28 is connected to the middle part of the connecting member 2312 in the third direction, a force application point allowing the driving assembly 28 to act on the connecting member 2312 is at the middle part of the connecting member 2312. In this way, left and right sides of the guide member 2311 in the third direction are subjected to equal stress, so that the problem that one side of the guide member 2311 is worn more seriously, thus causing a cutting gap between the moving cutter 232 and the stationary cutter 22 is solved, and the cutting effect is good.

The guide member 2311 comprises at least two groups of guide rods, each group of guide rods comprises at least one guide rod 23111, and the extension direction of each guide rod 23111 is parallel to the first direction. The two groups of guide rods are symmetrically arranged on two sides of the centerline L, and two ends of each guide rod 23111 are respectively connected with the moving cutter 232 and the connecting member 2312. By providing the guide member 2311 with two groups of guide rods, the guide member 2311 can slide more smoothly relative to the cutter holder 21.

In a specific embodiment, each group of guide rods comprises a guide rod 23111, and the second end of the driving assembly 28 is connected to the middle part of the connecting member 2312 in the third direction. In this way, the two guide rods 23111 are subjected to equal stress, thus avoiding the situation that one guide rod 23111 is worn more seriously.

Figure 6:
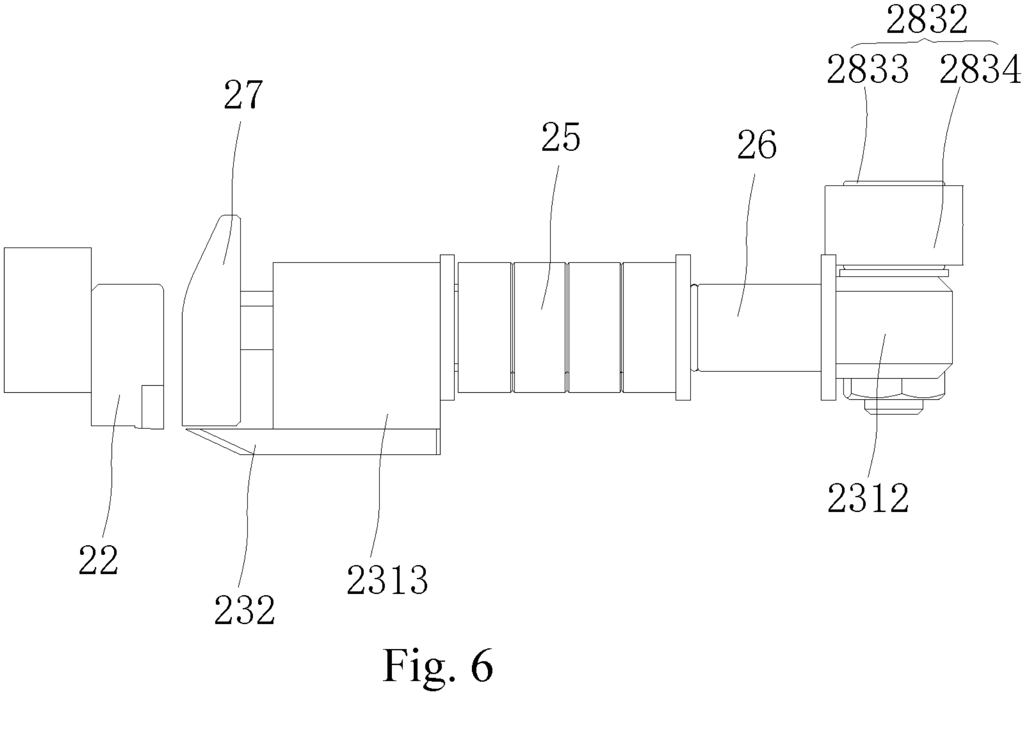
FIG. 6 is a partial structural diagram of the structure shown in FIG. 2.

Specifically, referring to FIG. 6, guide sleeves 25 are arranged in the cutter holder 21, and each guide rod 23111 is sleeved with the corresponding guide sleeve 25, so as to reduce the friction between the guide rod 23111 and the cutter holder 21 and reduce wear. The cutting mechanism 20 further comprises a first elastic piece 26 which is arranged between the guide sleeve 25 and the connecting member 2312 to provide a buffer for the moving cutter assembly 23.

Preferably, the connecting member 2312 is of a rod-shaped structure to further reduce the weight of the mounting piece 231 and facilitate the sliding of the mounting piece 231 relative to the cutter holder 21.

It can be understood that in other embodiments, the specific arrangement of the mounting piece 231 is not limited, as long as the mounting piece 231 can be connected with the driving assembly 28 and can drive the moving cutter 232 mounted thereon to move relative to the cutter holder 21 under the driving of the driving assembly 28.

In an embodiment, referring to FIG. 6, the mounting piece 231 further comprises a mounting plate 2313 which is connected with the guide rod 23111, and the moving cutter 232 is mounted on the mounting plate 2313. In this way, the installation of the moving cutter 232 is facilitated.

Further, the cutting mechanism 20 comprises a pressing piece 27 which is movably arranged on the mounting plate 2313 in the first direction, so as to press the pole piece on the stationary cutter 22 before the moving cutter 232 and the stationary cutter 22 cooperate to cut the pole piece, thus facilitating the cutting of the pole piece.

Referring to FIG. 4, the driving assembly 28 comprises a driving plate 282, a mating piece 281 and a connecting block 283. The mating piece 281 is connected to the driving plate 282 and is matched with the guide mechanism 50, and the connecting block 283 is connected to the driving plate 282 and the mounting piece 231. In this way, the structure of the driving assembly 28 is simplified. Specifically, the mating piece 281 is a roller disposed at an end of the driving plate 282, and the roller is disposed in a guide groove 51 (described below) of the guide mechanism 50.

In a specific embodiment, the driving plate 282 is of an L-shaped structure, the roller is connected to a short side 2821 of the L-shaped structure, and the connecting block 283 is connected to the outside of a long side 2822 of the L-shaped structure. In this way, the driving plate 282 will not hinder the roller from cooperating with the guide groove 51, and connection with the connecting member 2312 is facilitated. Of course, in other embodiments, the specific shape of the driving plate 282 is not limited.

Further, one of the driving plate 282 and the cutter holder 21 is provided with first sliding rails 60 parallel to the first direction, and the other is provided with first sliders 70 which are slidably connected with the first sliding rails 60. The driving plate 282 and the cutter holder 21 are slidably connected in the first direction through the cooperation of the first sliders 70 and the first sliding rails 60. Specifically, there are two first sliding rails 60, and the two first sliding rails 60 are distributed on two sides of the connecting block 283 in the third direction. Correspondingly, there are two groups of first sliders 70 matched with the first sliding rails 60. Therefore, the operation stability of the whole structure can be improved.

In one embodiment, still referring to FIG. 4, the connecting block 283 comprises a first connecting part 2831 and a second connecting part 2832. The first connecting part 2831 is connected to one of the mounting piece 231 and the driving plate 282, and the second connecting part 2832 is connected to the other of the mounting plate 2313 and the driving plate 282. The first connecting part 2831 is provided with a mating hole, the second connecting part 2832 extends in a direction parallel to the second direction, and the second connecting part 2832 penetrates through the mating hole.

Specifically, the second connecting part 2832 is connected to the mounting piece 231, and the first connecting part 2831 is connected to the driving plate 282. It should be understood that in other embodiments, the second connecting part 2832 can also be connected with the driving plate 282, and in this case, the first connecting part 2831 is connected with the mounting piece 231.

In this way, through the cooperation of the second connecting part 2832 and the mating hole, connection between the driving assembly 28 and the mounting piece 231 is facilitated, and at the same time, the installation error of the driving assembly 28 and the mounting piece 231 in the second direction (the axial direction of the second connecting part 2832) can be eliminated.

The mating hole of the first connecting part 2831 is a waist-shaped hole, and the waist-shaped hole extends longitudinally in a direction parallel to the third direction (the extending direction of the stationary cutter 22 and the moving cutter 232), so that a moving gap exists between the second connecting part 2832 and the mating hole in the third direction, which helps to eliminate the installation error of the driving assembly 28 and the mounting piece 231 in the third direction.

In a specific embodiment, still referring to FIG. 6, the second connecting part 2832 comprises a body 2833 and a sleeve 2834 sleeving the body 2833, and both the body 2833 and the sleeve 2834 penetrate through the mating hole. In this way, when the driving assembly 28 and the mounting piece 231 move relatively, friction is small and wear is reduced.

Figure 7:
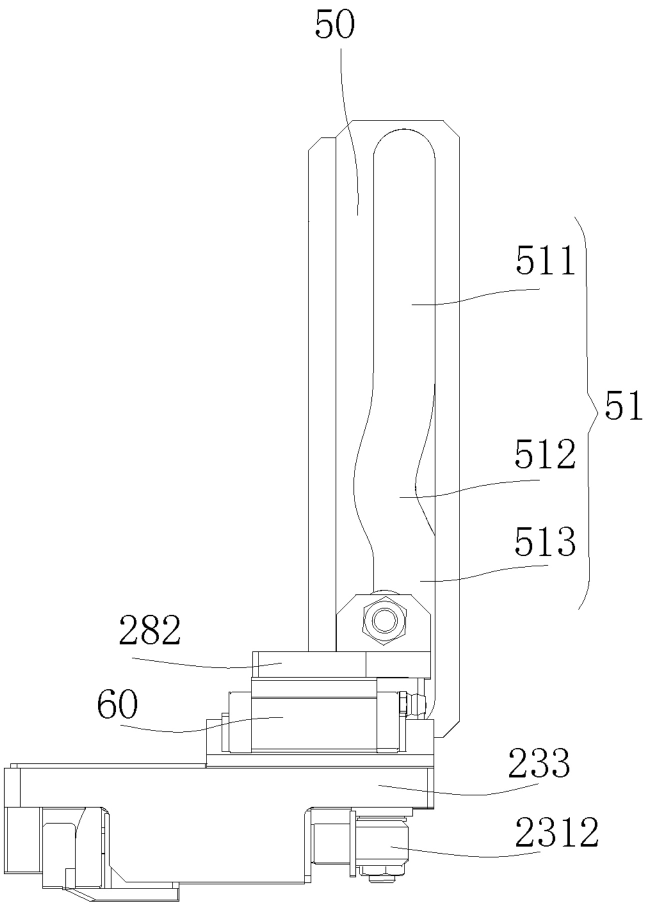
FIG. 7 is a front view of the cutting mechanism and the guide mechanism shown in FIG. 4.

In one embodiment, referring to FIG. 7, a side of the guide mechanism 50 facing the driving assembly 28 is provided with a guide groove 51, and the guide groove 51 is provided with a first straight groove section 511, an arc groove section 512 and a second straight groove section 513 which communicate with each other in sequence; and the first straight groove section 511 and the second straight groove section 513 both extend in the second direction, and the arc groove section 512 bends in the first direction to one side of the stationary cutter 22. In this way, when the cutter holder 21 drives parts mounted thereon to move in the second direction relative to the mounting base 10, the roller moves along the track of the guide groove 51 in the guide groove 51, and when the roller moves to the arc groove section 512, under the action of the arc groove section 512, the driving assembly 28 drives the mounting piece 231 to move in the first direction, so that the mounting piece 231 drives the moving cutter 232 to move close to the stationary cutter 22 and cooperate with the stationary cutter 22 to cut the workpiece at a preset position, thus realizing fly-cutting.

Of course, in other embodiments, the specific arrangement of the guide mechanism 50 is not limited, as long as it can guide the driving assembly 28 in the second direction and make the driving assembly 28 apply a driving force to the mounting piece 231, so that the mounting piece 231 drives the moving cutter 232 to move in the first direction.

The feeding device 100 further comprises a second actuator, and the guide mechanism 50 is connected with a second driving end of the second actuator. By driving the guide mechanism 50 to move away from or close to the roller, the second actuator adjusts the distance between the guide mechanism 50 and the roller, so as to control the distance between the guiding groove 51 of the guide mechanism 50 and the roller, that is, control the restriction of the guide mechanism 50 on the driving assembly 28. Specifically, when the roller is completely separated from the guide groove 51 of the guide mechanism 50, the restriction of the guide mechanism 50 on the driving assembly 28 is released, that is, the restriction of the guide mechanism 50 on the moving cutter assembly 23 is released. When the roller is matched with the guide groove 51 of the guide mechanism 50, the guide mechanism 50 restricts the moving track of the moving cutter assembly 23.

In an embodiment, still referring to FIG. 1, the feeding device 100 further comprises a clamping mechanism 80 which is slidably connected with the mounting base 10 in the second direction, and the clamping mechanism 80 and the cutting mechanism 20 are sequentially arranged in the second direction. In the second direction, the clamping mechanism 80 and the cutting mechanism 20 are able to synchronously slide relative to the mounting base 10. Specifically, the moving speed of the clamping mechanism 80 is equal to the conveying speed of the pole piece, so that the clamping mechanism 80 can clamp the pole piece before the cutting mechanism 20 cuts the pole piece. In this way, when the cutter holder 21 drives parts thereon to move in the second direction, the clamping mechanism 80 can move synchronously, and before the moving cutter 232 and the stationary cutter 22 cut the pole piece at the preset position, the clamping mechanism 80 can clamp the pole piece to prevent the displacement of the pole piece when being cut by the cutting mechanism 20, so as to improve cutting accuracy.

Figure 8:
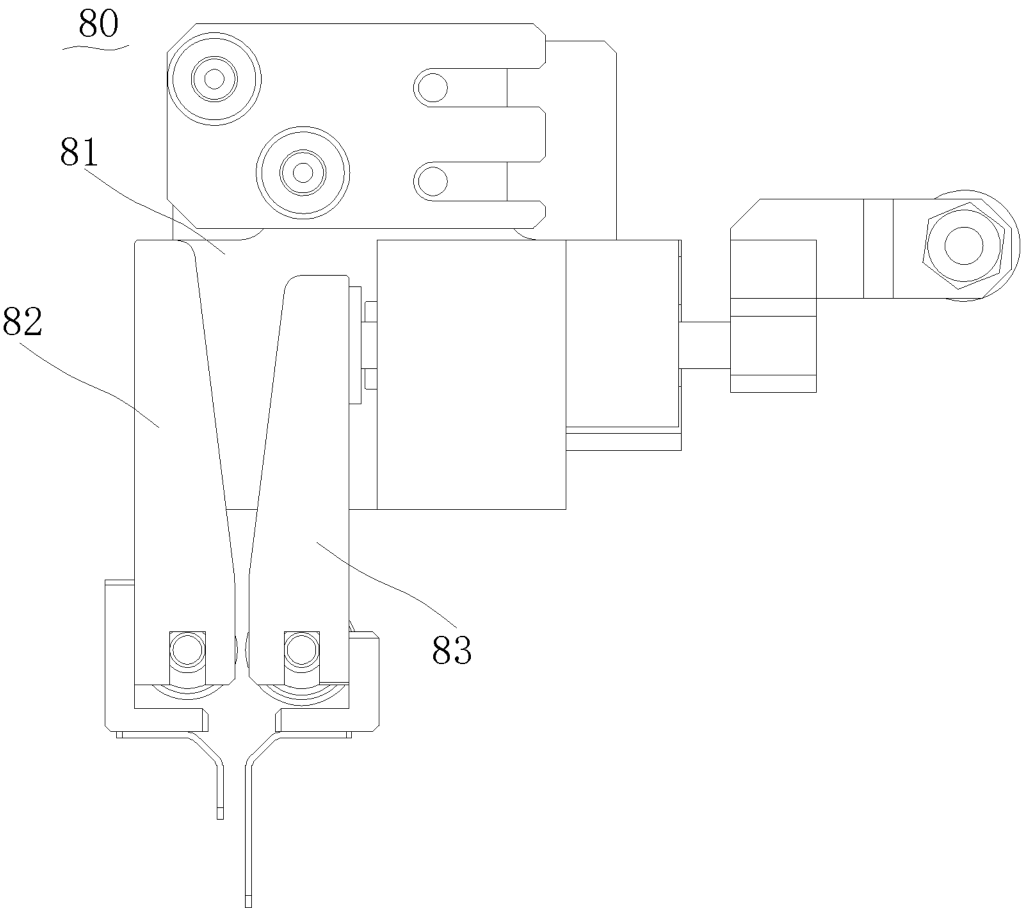
FIG. 8 is a front view of a clamping mechanism of the feeding device shown in FIG. 1.
Figure 9:
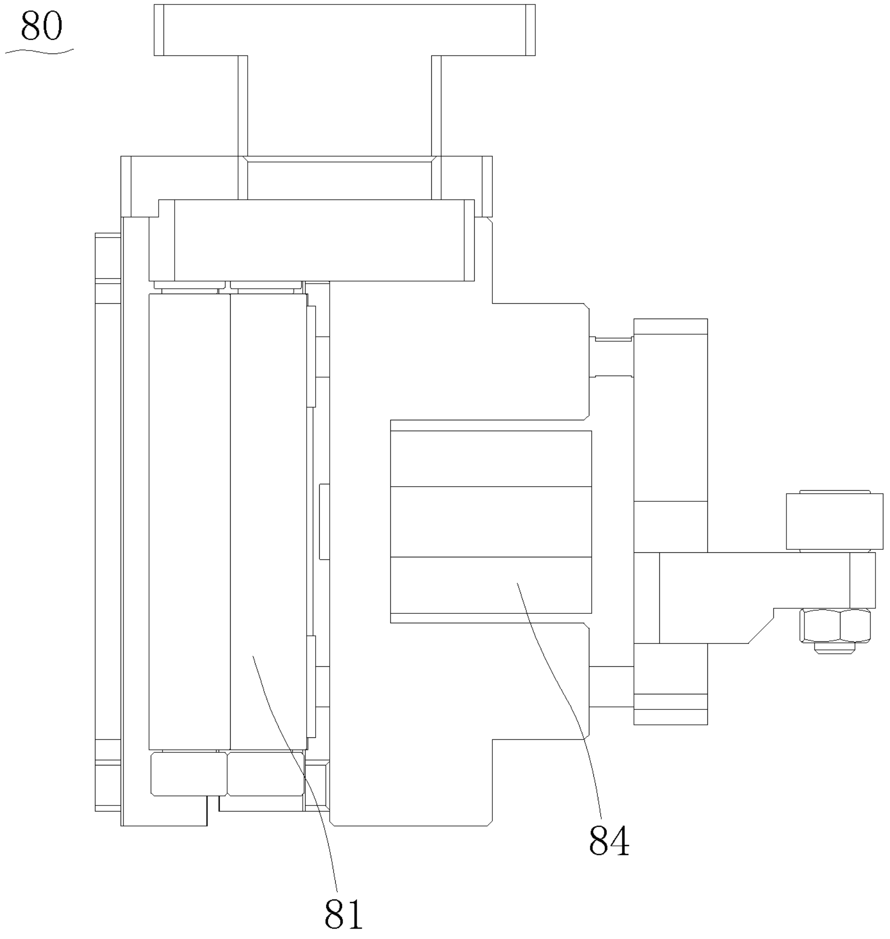
FIG. 9 is a top view of the clamping mechanism shown in FIG. 8.

Referring to FIGS. 8 and 9, the clamping mechanism 80 comprises a clamping base 81, a fixed clamping roller 82 and a movable clamping roller 83. The clamping base 81 is slidably connected with the mounting base 10 in the second direction, the fixed clamping roller 82 is fixedly arranged on the clamping base 81, and the movable clamping roller 83 is movably connected with the clamping base 81 to clamp the pole piece in cooperation with the fixed clamping roller 82. The clamping mechanism 80 further comprises a third actuator 84 arranged on the clamping base 81, the movable clamping roller 83 is connected with a third driving end of the third actuator 84, and the third actuator 84 is controlled to drive the movable clamping roller 83 to move close to or away from the fixed clamping roller 82. Specifically, the third actuator 84 is a driving cylinder. In other embodiments, the third actuator 84 is not particularly limited, as long as it can drive the movable clamping roller 83 to move.

In other embodiments, the specific structure of the clamping mechanism 80 is not limited as long as it can clamp the pole piece.

Further, the mounting base 10 is provided with third sliding rails, and the clamping base 81 is provided with third sliders which are slidably connected with the third sliding rails. The clamping base 81 is slidably connected with the mounting base 10 in the second direction through the cooperation of the third sliders and the third sliding rails. Further, the first sliding rail 60 and the third sliding rail are the same sliding rail, so that the structure is more compact and the volume of the feeding device 100 is reduced.

In an embodiment, still referring to FIG. 5, the feeding device 100 further comprises a fourth actuator 90, the clamping base 81 is connected with a fourth driving end of the fourth actuator 90, and the fourth actuator 90 is controlled to drive the clamping base 81 to drive parts thereon to move in the second direction. Specifically, the fourth actuator 90 is a motor. Of course, in other embodiments, the type of the fourth actuator 90 is not limited, for example, the fourth actuator 90 may be a cylinder.

The technical features of the above embodiments can be combined freely. In order to make the description concise, all possible combinations of the technical features in the above embodiments are not described. However, as long as there is no contradiction in the combinations of these technical features, they should be considered as falling in the scope recorded in this specification.

The above embodiments only several implementation ways of the application, and their descriptions are specific and detailed, but they cannot be understood as limiting the scope of the patent of the invention. It should be pointed out that, for those of ordinary skill in the art, without departing from the concept of the application, several modifications and improvements can be made, which belong to the protection scope of the application. Therefore, the scope of protection of the patent of the application shall be subject to the appended claims.

What is claimed is:

1. A feeding device for feeding and cutting a pole piece, comprising:
- a mounting base;
- a cutting mechanism mounted on the mounting base; and
- a guide mechanism;
- the cutting mechanism comprising:
  - a cutter holder;
  - a stationary cutter fixedly arranged on the cutter holder;
  - a moving cutter assembly comprising a mounting piece and a moving cutter, the mounting piece slidably arranged on the cutter holder, the moving cutter mounted on the mounting piece, and the mounting piece having a centerline parallel to a direction of sliding of the mounting piece; and
  - a driving assembly comprising a first end and a second end, the first end matched with the guide mechanism, and the second end connected to a part of the mounting piece corresponding to the centerline;
- wherein when the cutter holder drives parts located thereon to move, the guide mechanism can drive the driving assembly to apply a driving force to the mounting piece in the direction of sliding of the mounting piece, so that the mounting piece drives the moving cutter to move close to the stationary cutter so as to cut the pole piece at a preset position.

2. The feeding device according to claim 1, wherein the feeding device further comprises a clamping mechanism for clamping the pole piece, the clamping mechanism is slidably connected with the mounting base in a direction of moving of the cutter holder, and the clamping mechanism and the cutting mechanism are sequentially arranged in the direction of moving of the cutter holder; and
- the clamping mechanism and the cutting mechanism is configured to synchronously slide relative to the mounting base.

3. The feeding device according to claim 2, wherein the clamping mechanism comprises a clamping base, a fixed clamping roller and a movable clamping roller, the clamping base is slidably connected with the mounting base in the direction of moving of the cutter holder, the fixed clamping roller is fixedly arranged on the clamping base, and the movable clamping roller is movably connected with the clamping base to cooperate with the fixed clamping roller so as to clamp the pole piece.

4. The feeding device according to claim 1, wherein the feeding device further comprises a actuator, the cutter holder is connected with a driving end of the actuator, and the actuator is able to drive the cutter holder to move together with parts thereon.

5. The feeding device according to claim 1, wherein a side of the guide mechanism facing the driving assembly is provided with a guide groove, and the guide groove is provided with a first straight groove section, an arc groove section and a second straight groove section communicating with each other in sequence; and
- the first straight groove section and the second straight groove section both extend in the direction of moving of the cutter holder, the arc groove section bends in the direction of sliding of the mounting piece to one side of the stationary cutter, and a first end of the driving assembly is slidably arranged in the guide groove.

6. The feeding device according to claim 1, wherein the mounting piece comprises a guide member and a connecting member, and the guide member is slidably arranged on the cutter holder in the direction of sliding of the mounting piece; and
- the moving cutter and the connecting member are respectively connected to two ends of the guide member, and the driving assembly is connected with a part of the connecting member corresponding to the centerline.

7. The feeding device according to claim 6, wherein the guide member comprises at least two groups of guide rods, each group of the guide rods comprises at least one guide rod, and an extension direction of each said guide rod is parallel to the direction of sliding of the mounting piece; and
- the two groups of guide rods are symmetrically arranged on two sides of the centerline, and two ends of each said guide rod are respectively connected with the moving cutter and the connecting member.

8. The feeding device according to claim 7, wherein guide sleeves are arranged in the cutter holder, and each said guide rod is sleeved within a corresponding guide sleeve.

9. The feeding device according to claim 2, wherein the cutting mechanism further comprises first elastic pieces, and the first elastic pieces are arranged between the guide sleeves and the connecting member.

10. The feeding device according to claim 9, wherein the mounting piece further comprises a mounting plate, the mounting plate is connected with the guide member, and the moving cutter is mounted on the mounting plate.

11. The feeding device according to claim 10, wherein the cutting mechanism further comprises a pressing piece, and the pressing piece is movably arranged on the mounting plate in the direction of sliding of the mounting piece to press the pole piece on the stationary cutter before the moving cutter and the stationary cutter cooperate to cut the pole piece.

12. The feeding device according to claim 1, wherein one of the driving assembly and the cutter holder is provided with sliding rails parallel to the direction of sliding of the mounting piece, the other is provided with sliders, and the sliders are slidably connected with the sliding rails.

13. The feeding device according to claim 1, wherein the cutting mechanism further comprises a second elastic piece, and the second elastic piece is sandwiched between the cutter holder and the stationary cutter.

* * * * *